United States Patent
Ogawa (10) Patent No.: US 8,733,948 B2
(45) Date of Patent: May 27, 2014

(54) LIGHT SOURCE UNIT AND PROJECTOR

(75) Inventor: Masahiro Ogawa, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 298 days.

(21) Appl. No.: 12/422,619

(22) Filed: Apr. 13, 2009

(65) Prior Publication Data

US 2009/0262308 A1   Oct. 22, 2009

(30) Foreign Application Priority Data

Apr. 16, 2008   (JP) ................................ 2008-106884

(51) Int. Cl.
  *G03B 21/26* (2006.01)
(52) U.S. Cl.
  USPC ............................................ 353/94; 359/634
(58) Field of Classification Search
  USPC .............. 353/94, 31; 313/1; 359/634; 257/90
  See application file for complete search history.

(56) References Cited

U.S. PATENT DOCUMENTS

| | | | |
|---|---|---|---|
| 5,398,086 A * | 3/1995 | Nakano et al. ................. | 353/31 |
| 7,070,300 B2 | 7/2006 | Harbers et al. | |
| 7,234,820 B2 * | 6/2007 | Harbers et al. ................. | 353/94 |
| 7,547,114 B2 * | 6/2009 | Li et al. .......................... | 362/231 |
| 2006/0033886 A1 * | 2/2006 | Kim et al. ....................... | 353/37 |
| 2006/0256445 A1 * | 11/2006 | Zueger .......................... | 359/634 |
| 2007/0081336 A1 * | 4/2007 | Bierhuizen et al. ............ | 362/293 |
| 2010/0117997 A1 * | 5/2010 | Haase ............................ | 345/204 |

FOREIGN PATENT DOCUMENTS

| | | |
|---|---|---|
| JP | 2005-274836 A | 10/2005 |
| JP | 2005-347263 A | 12/2005 |
| JP | 2006-018162 A | 1/2006 |
| JP | 2006-208894 A | 8/2006 |

OTHER PUBLICATIONS

Japanese Office Action dated Apr. 22, 2010 and English translation thereof, issued in counterpart Japanese Application No. 2008-106884.

* cited by examiner

*Primary Examiner* — Francis M Legasse, Jr.
*Assistant Examiner* — Jerry Brooks
(74) *Attorney, Agent, or Firm* — Holtz Holtz Goodman & Chick PC (57) ABSTRACT

In a projector which includes a light source unit 63, a light smoothing unit, a display device, a projection side optical system and a projector control unit, the light source unit 63 includes a light generating device for generating light of a specified wavelength band which includes a first light source 152 which is a light emitting diode or solid-state light emitting device for emitting light of a predetermined wavelength band, a second light source 153 which is a light emitting diode or a solid-state light emitting device for emitting excitation light, and a third light source 154 for emitting light of the same wavelength band as that of the first light source 152 using the light emitted from the second light source 153 as excitation energy, and the third light source 154 is formed by a phosphor which transmits light from the first light source 152 and absorbs light emitted from the second light source 153.

24 Claims, 5 Drawing Sheets

LIGHT SOURCE UNIT AND PROJECTOR

CROSS-REFERENCE TO RELATED APPLICATIONS

This application is based upon and claims the benefit of priority under 35 USC 119 of Japanese Patent Application No. 2008-106884 filed on Apr. 16, 2008, the entire disclosure of which, including the description, claims, drawings, and abstract, is incorporated herein by reference in its entirety

BACKGROUND OF THE INVENTION

1. Field of the Invention

The present invention relates to a light source unit which employs light emitting diodes or solid state light emitting devices and a projector which includes the light source unit.

2. Description of the Related Art

In these days, data projectors are used in many cases as an image projection apparatus for projecting screens and video images of a personal computer and, further, images based on image data stored in a memory card onto a screen. In projectors of this type, light emitted from a light source is concentrated on to a micromirror display device referred to as a DMD or a liquid crystal panel so as to display a color image on to a screen.

In these projectors, conventionally, projectors employing highly bright discharge lamps as light sources have been the mainstream of projectors. However, in recent years, there have been developments in projectors employing, as light sources, red, green and blue light emitting diodes or solid-state light emitting devices such as organic electroluminescence light emitting devices and laser, and there have been made many proposals.

Compared with discharge lamps, light emitting diodes are advantageous in that they consume less power and highly reliable However, the amount of light emitted by a single light emitting diode is still not good enough for use as a light source for a projector, leading to a problem that a desired luminance cannot be obtained. Then, in order for light emitting diodes to be used as a light source of a projector, there exists a case where a plurality of light emitting diodes are disposed, and lights from the plurality of light emitting diodes are combined for use.

For example, Japanese Unexamined Patent Publication No. 2005-274836 proposes a light source unit in which a plurality of white light emitting diodes are installed adjacent to one another on a substantially ellipsoidal or paraboloidal base member and are arranged so that their focal points are situated in the vicinity of a light incident surface of a light guiding or smoothing unit.

In addition, Japanese Unexamined Patent Publication No. 2006-208894 proposes a light source unit in which three light sources in each of which a plurality of light emitting diodes are arranged in an array are disposed on three sides of a cross dichroic mirror, and a rod integrator having a vertically elongated truncated quadrangular pyramid shape is disposed on an optical axis of a beam of light emitted from the cross dichroic mirrors so as to combine light emitted from the plurality of bright points.

In an optical system of an image display device or the like, a spatial expanse in which radiant flux which is handled effectively exists can be expressed by area and solid angle, and a product thereof is referred to as Etendue. The Etendue is a value preserved in the optical system.

In the projector which employs the display device such as the DMD described above, assuming that the area of an illuminated region of the display device is S' and the solid angle of incident light which can be taken in by the area S' of the illuminated region is Q', the Etendue of the display device is expressed by S'×Q'. In addition, assuming that the area of a light emitting region of the light source unit is S and the solid angle of emitted light is Q, the Etendue of the light source unit is expressed by S×Q.

Since Etendue is the value preserved in the optical system, when the value of the Etendue of the light source unit which is expressed by S×Q is smaller than the value of the Etendue of the display device which is expressed by S'×Q', all the light emitted from the light source unit can be used, and hence, all the emitted light becomes effective light. However, when the value of the Etendue of the light source unit which is expressed by S×Q is larger than the value of the Etendue of the display device which is expressed by S'×Q', there occurs a situation in which some of the light emitted form the light source unit cannot be used.

In the related-art projectors which employ light emitting diodes, since the amount of light emitted from a light emitting diode is small, a plurality of light emitting diodes need to be provided in such a manner that beams of light emitted from the plurality of light emitting diodes are collected for use. However, when the plurality of diodes are used, since the light emitting area becomes large, the value of the Etendue of the light source unit becomes larger than the value of the Etendue of the light display device, and since the amount of light that cannot be used is increased, there is caused a problem that the utilization efficiency of the light emitting diodes is reduced.

In addition, in light emitting diodes, the light emitting efficiency of a green light emitting diode is lower than those of a red light emitting diode and a blue light emitting diode, a larger number of green light emitting diodes need to be provided than red light emitting diodes and blue light emitting diodes. In this case, even though light emitting diodes are collected together densely, the area of light emitting areas increases as the number of light emitting diodes provided increases, and therefore, since the value of Etendue of green light emitting diodes is increased, the ratio of effective light is decreased, and after all, there still exists a problem that the insufficient quantity of usable light from the green light emitting diodes remains unsolved.

SUMMARY OF THE INVENTION

The invention has been made in view of the problem inherent in the related-art and an object thereof is to provide a projector which can project a projection image of higher luminance when light emitting diodes or solid-state light emitting devices are used as light sources.

According to a preferred aspect of the invention, there is provided a light source unit comprising a first light source which is a light emitting diode or solid-state light emitting device for emitting light of a predetermined wavelength band, a second light source which is a light emitting diode or a solid-state light emitting device for emitting excitation light, and a third light source for emitting light of the same wavelength band as that of the first light source using the light emitted from the second light source as excitation energy.

In addition, according to another preferred aspect of the invention, there is provided a projector comprising a light source unit comprising a first light source which is a light emitting diode or solid-state light emitting device for emitting light of a predetermined wavelength band, a second light source which is a light emitting diode or a solid-state light emitting device for emitting excitation light, and a third light source for emitting light of the same wavelength band as that of the first light source using the light emitted from the second light source as excitation energy, a light smoothing unit, a display device, a projection side optical system, and a projector control unit.

DETAILED DESCRIPTION OF THE PREFERRED EMBODIMENT

A projector 10 according to a best mode for carrying out the invention includes a light source unit 63, a light guiding unit or light smoothing unit 75, a display device 51, a projection side optical system 90, and a projector control unit.

The light source unit 63 includes three light source devices having specific wavelength bands such as a red light source device 151R which employs red light emitting diodes 161R which emit red light, a green light source device 151G which emits green light and a blue light source device 151B which employs blue light emitting diodes 161B which emit blue light. The green light source device 151G includes a first light source 152 which is formed by a plurality of green light emitting diodes 161G which emit single-color light of green and, in addition thereto, a second light source 153 which is formed by a plurality of blue light emitting diodes 161B which emit excitation light and a third light source 154 which is formed by a board-like luminescent element which emits green light using the light emitted from the second light source 153 as excitation energy.

In addition, the third light source 154 is formed by a phosphor which transmits light emitted from the first light source 152 and absorbs light emitted from the second light source 153. A dichroic mirror is provided in a position where an optical axis of the first light source 152 intersects an optical axis of the second light source 153 as a light combining device 158 which combines optical axes of light emitted from the first light source 152 and light emitted from the second light source 153, and the third light source 154 is disposed on an optical axis of a beam of light resulting from light combined by the dichroic mirror.

Figure 1:
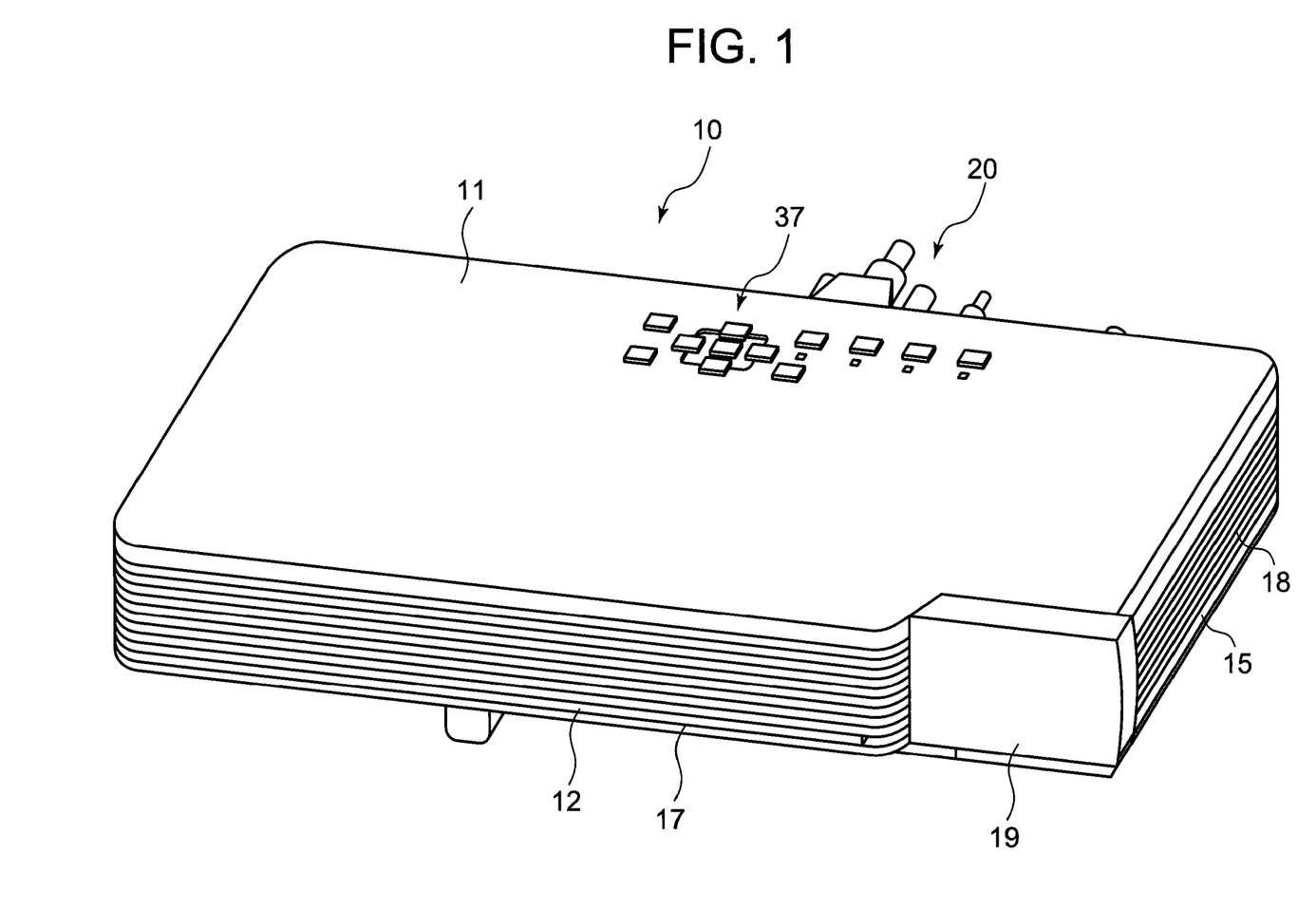
FIG. 1 is a perspective view showing an external appearance of a projector according an embodiment of the invention.

Hereinafter, an embodiment of the invention will be described based on the drawings. As is shown in FIG. 1, a projector 10 according to the embodiment of the invention has a substantially rectangular parallelepiped shape, and the projector 10 has a lens cover 19 which is provided to a side of a front panel 12 which is a front side lateral panel of a body casing of the projector 10 for covering a projection opening, a plurality of air outlet slots 17 being provided in the front panel 12. Further, although not shown, the projector 10 includes an Ir reception part for receiving a control signal from a remote controller.

In addition, the projector 10 has a key/indicator part 37 on an upper panel 11 of the body casing, and this key/indicator part 37 includes keys and indicators including such as a power supply switch key, a power indicator for informing that the power supply is on or off, a projection switch key for switching on and off the projection, and an overheat indicator for informing of overheat of the light source unit, a display device or a control circuit.

Further, when looking at a back side of the body casing, the projector 10 has on a back panel thereof an input/output connector part where a USB terminal, an image signal inputting D-SUB terminal, an S terminal, an RCA terminal and the like are provided and various terminals 20 including a power supply adapter plug and the like.

In addition, the projector 10 has a plurality of air inlet slots 18 which are provided in the vicinity of a lower portion of each of a right-hand panel 14, not shown in FIG. 1, which configures a lateral panel of the body casing and a left-hand panel 15 which is a lateral side panel of the body casing shown in FIG. 1.

Figure 2:
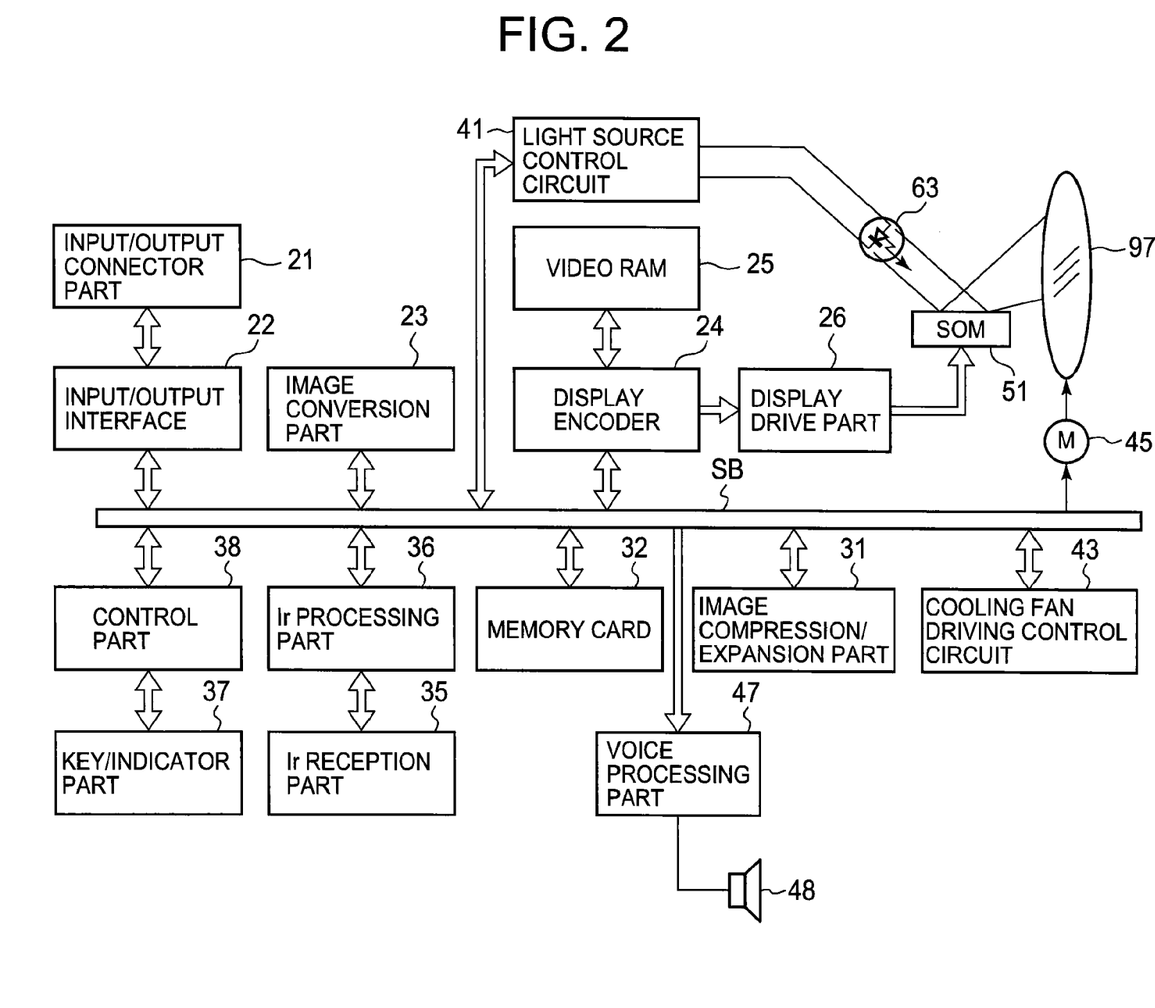
FIG. 2 is a block diagram showing functional circuit blocks of the projector according to the embodiment of the invention.

Additionally, as is shown in FIG. 2, the projector control unit of the projector 10 has a control part 38, an input/output interface 22, an image transforming part 23, a display encoder 24, and a display driving part 26. Then, image signals of various standards which are inputted from the input/output connector part 21 are sent to the image transforming part 23 via the input/output interface 22 and a system bus (SB) where the image signals are converted into a unified image signal in a predetermined format and the unified images signal so converted is then sent to the display encoder 24.

In addition, the display encoder 24 deploys the image signal sent thereto in a video RAM 25 for storage therein and thereafter creates a video signal from the contents stored in the video RAM 25 for output to the display driving part 26.

Then, the display driving part 26, into which video signals are inputted from the display encoder 24, drives the display device 51 which is a spatial optical modulator (SOM) at an appropriate frame rate in response to image signals sent thereto. This display device 51 is controlled to be driven by the display drive part 26. In this projector 10, when a pencil of light emitted from the light source unit 63 enters the display device 51 via a light source side optical system, a light image is formed by light reflected from the display device 51, and the image so formed is then projected on to a screen, not shown, for display thereon via a projection system lens group which constitutes the projection side optical system. In this projection side optical system, a movable lens group 97 is driven by a lens motor 45 for zooming and focusing.

In addition, an image compression and expansion part 31 performs a recording operation in which a luminance signal and a color difference signal in the image signal are subjected to data compression by ADCT (adaptive discrete cosine transformation) and Huffman coding operations so as to be written sequentially into a memory card 32 which is a detachable recording medium. When in a reproduction mode, the image compression and expansion part 31 reads out image data recorded in the memory card 32 so as to expand individual image data which configure a series of moving pictures frame by frame, and the image data so expanded frame by frame are then sent to the display encoder 24 via the image transforming part 23, whereby the projector 10 enables the display of moving pictures based on the image data stored in the memory card 32.

Then, the control part 38 governs the control of operations of respective circuits within the projector 10 and is made up of a CPU, a ROM which stored fixedly operation programs such as various types of settings and a RAM which is used as a work memory.

In addition, an operation signal of the key/indicator part 37 which includes main keys and indicators provided on the upper panel 11 of the body casing is sent directly to the control part 38, while a key operation signal from the remote controller is received by the Ir reception part 35, and a code signal demodulated in an Ir processing part 36 is sent to the control part 38.

Note that a sound processing part 47 is connected to the control part 38 via the system bus (SB). The sound processing part 47 includes a sound source circuit such as a PCM sound source and converts sound data into analog signals so as to radiate sound loudly via a speaker 48 which is driven for this purpose when in projection mode and in reproduction mode.

In addition, the control part 38 controls a light source control circuit 41 in such a manner that a red light source, a green light source and a blue light source are time-sharing controlled in response to an image signal sent thereto. Further, the control part 38 also controls a cooling fan drive control circuit 43, and this cooling fan drive control circuit 43 causes a plurality of temperature sensors provided on the light source unit 63 and the like to detect temperatures in locations where they are provided for control of the rotational speed of a cooling fan. In addition, the cooling fan drive control circuit 43 also causes the cooling fan to continue rotating by the use of a timer even after the power supply to the projector main body has been turned off. Furthermore, the cooling fan drive control circuit 43 turns off the power supply to the projector main body depending upon the results of temperature detections by the temperature sensors.

Figure 3:
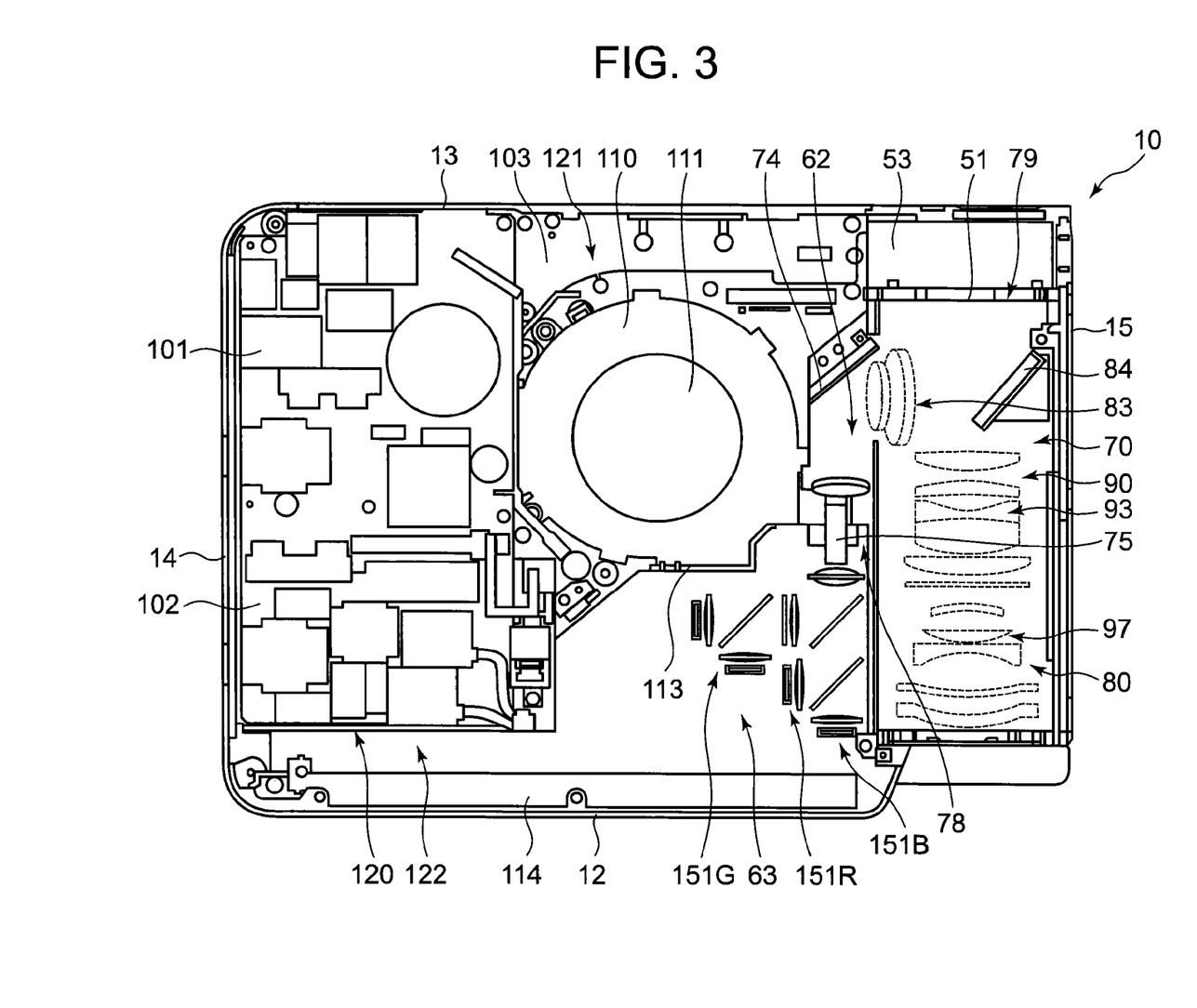
FIG. 3 is a plan view of the projector according to the embodiment of the invention with an upper panel thereof removed.

In addition, these ROM, RAM, ICs and circuit devices are incorporated in a control circuit board 103 which functions as a main control circuit board shown in FIG. 3 and a power supply circuit block 101, and the control circuit board 103 which configures the main control circuit board for a control system and a light source control circuit board 102 to which the power supply circuit block 101 for a power system is attached are formed separately.

As is shown in FIG. 3, in an interior construction of the projector 10, the light source control circuit board 102 to which the power supply circuit block 101 is attached is disposed in the vicinity of the right-hand panel 14, and an interior of the body housing is partitioned air tightly by a partition wall 120 into an air inlet side space compartment 121 which lies on the back panel 13 side and an air outlet side space compartment 122 which lies on the front panel 12 side. In addition, a sirocco fan type blower 110 which functions as the cooling fan is disposed in such a manner that an inlet port 111 is positioned in the air inlet side space compartment 121 and an outlet port 113 is positioned on a boundary between the air outlet side space compartment 122 and the air inlet side space compartment 121.

Additionally, disposed within the air outlet side space compartment 122 are the light source unit 63, a light guiding or smoothing unit 75 which is included in an illumination side block 78 of an optical system unit 70 for guiding light emitted from the light source unit 63 to the display device 51 while smoothing it and an outlet air temperature reduction device 114.

Figure 4:
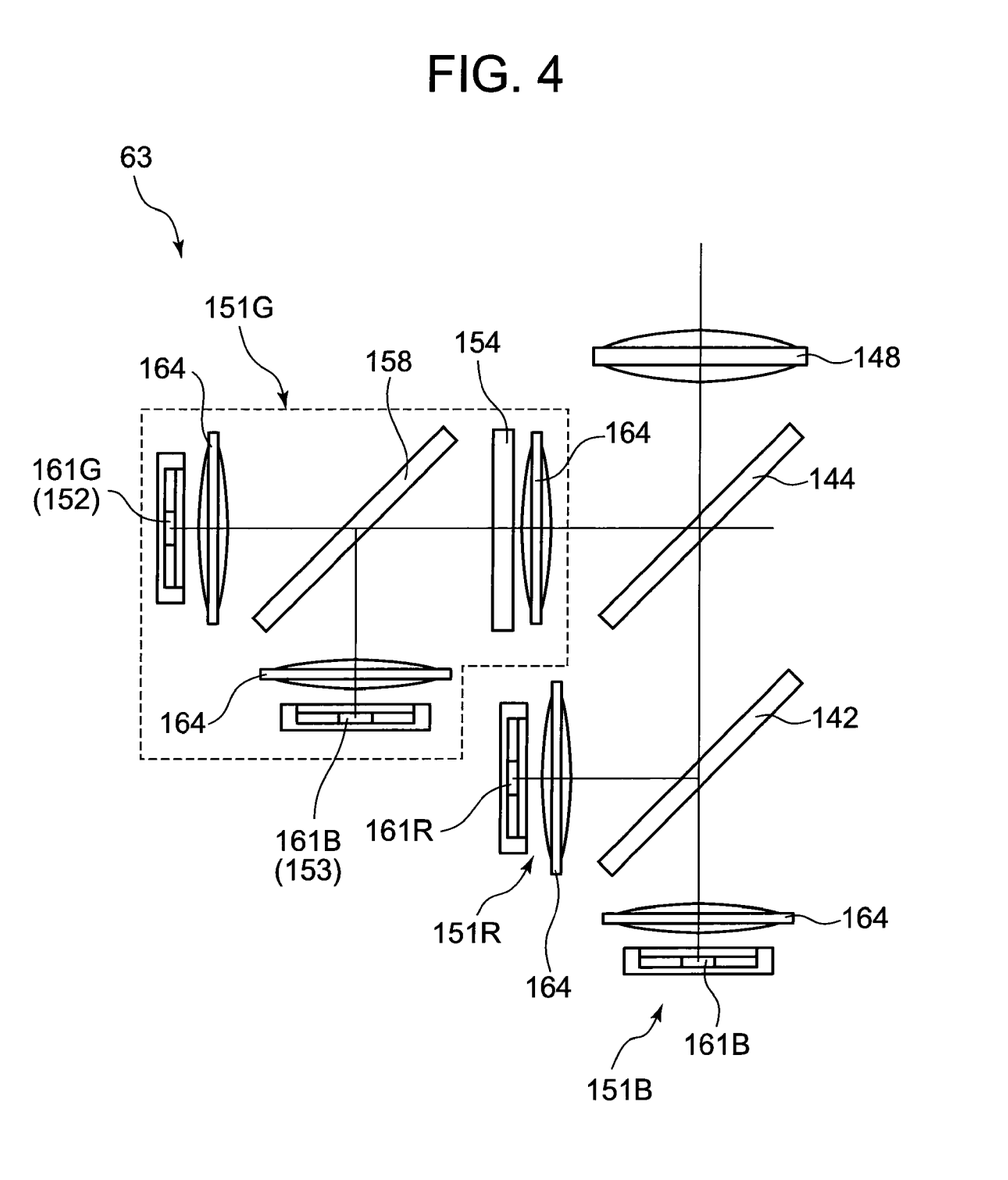
FIG. 4 is a sectional view of a light source unit according to the embodiment of the invention.

As is shown in FIG. 4, this light source unit 63 includes a red light source device 151R as a light source device with a predetermined wavelength band for emitting light of a specified wavelength band falling in a red light range, a green light source device 151G as a light source device with a predetermined wavelength band for emitting light of a specified wavelength band falling in a green light range and a blue light source device 151B as a light source device with a predetermined wave length band for emitting light of a specified wavelength band falling in a blue light range. The red light source device 151R is disposed in the vicinity of the front panel 12 shown in FIG. 3 in such a manner that its optical axis becomes substantially parallel to the front panel 12. The green light source device 151G is disposed closer to the back panel 13 than the red light source device 151R in such a manner as that its optical axis becomes parallel to that of the red light source device 151R. The blue light source device 151K is disposed in the vicinity of the red light source device 151R and the front panel 12 in such a manner that the optical axis of the red light source device 151R and an optical axis of the blue light source device 151B intersect each other at right angles.

In addition, the light source unit 63 including the three light source devices 151R, 151G, 151B which emit light of the different wavelength bands includes, in addition to the three light source devices 151R, 151G, 151K with the predetermined wavelength bands, a first dichroic mirror 142 which transmits blue light emitted from the blue light source device 151B and reflects red light emitted from the red light source device 151R so that the optical axis direction of red light becomes the same as the optical axis direction of blue light emitted from the blue light source device 151B, a second dichroic mirror 144 which transmits the red light which has been reflected by the first dichroic mirror 142 and the blue light which has transmitted the first dichroic mirror 142 and reflects green light emitted from the green light source device 151G so that the optical axis direction of green light becomes the same as the optical axis directions of red light and blue light, and a condensing lens 148 which concentrates red light, green light and blue light on to an incident surface of the light smoothing unit 75 shown in FIG. 3.

In addition, the first dichroic mirror 142 is disposed in a position where the optical axes of the red light source device 151R and the blue light source device 151B which are referred to as the light source devices with the predetermined wavelength bands intersect each other. Additionally, the second dichroic mirror 144 is disposed in a position where the axes of red light which has been reflected by the first dichroic mirror 142 and blue light which has transmitted the first dichroic mirror 142 intersect the optical axis of the green light source device 151G which is referred to as the light source device with the predetermined wavelength band. Further, the condensing lens 148 is disposed on an optical axis of a pencil of light into which red light and blue light and green light, which have transmitted the second dichroic mirror 144 and which has been reflected by the second dichroic mirror 144, respectively, are combined.

The red light source device 151R includes a required number of red light emitting diodes 161 which configure a light source which is time-sharing controlled by the projector control unit, a light source holding jig which holds the red light emitting diodes 161R, a transparent cover member which is disposed in the vicinity of the front of the red light emitting diodes 161R and a condensing lens 164 which concentrates light from the red light emitting diodes 161R.

This light source holding jig is made up of a back side and an edge portion which rises from an outer circumferential edge of the back side, and the red light emitting diodes 161R are disposed in the vicinity of a center of the back side. In addition, the cover member is a rectangular board which is formed of a transparent glass or resin and is disposed in the vicinity of a front end of an edge portion of the light source holding jig, so as to seal the front of the red light emitting diodes 161R.

Then, light emitted from the red light emitting diodes 161R passes through the cover member and is concentrated by the condensing lens 164 so as to be shone on to the first dichroic mirror 142. Then, the light is reflected by the first dichroic mirror 142, thereafter passes through the second dichroic mirror 144, and is concentrated on to the incident surface of the light smoothing unit 75 shown in FIG. 3 by the condensing lens 148.

In addition, the blue light source device 151B has the same configuration as that of the red light source device 151R and employs in place of the red light emitting diodes 161R a required number of blue light emitting diodes 161B as a light source which are time-sharing controlled. Light emitted from the blue light emitting diodes 161B passes through a cover member, is concentrated by a condensing lens 164 and is shone on to the first dichroic mirror 142. The light then passes through the first dichroic mirror 142, thereafter passes through the second dichroic mirror 144, and is concentrated on to the incident surface of the light smoothing unit 75 shown in FIG. 3 by the condensing lens 148.

In addition, the green light source device 151G, which is the light source device with the predetermined wavelength band which emits green light according to the embodiment, includes a green light emitting diode 161G which is referred to as a first light source 152, a blue light emitting diode 161B which are referred to as a second light source 153 which converts electric energy into excitation light, and a third light source 154 which receives light emitted from the second light source 153 and emits light with substantially the same spectral distribution as that of light emitted from the first light source 152. The green light source device 151G further includes a dichroic mirror as a light combining device 158 which is disposed in a position where optical axes of the first light source 152 and the second light source 153 intersect each other for transmitting light from the first light source 152 and reflecting light from the second light source 153 to thereby combine the light from the first light source 152 and the light from the second light source 153 together in such a manner that optical axes of both pencils of light coincide with each other, and a condensing lens 164 which is disposed in the vicinity of the third light source 154.

The green light emitting diode 161G, which is referred to as the first light source 152, is held by a light source holding jig as the respective light emitting diodes of the red light emitting diodes 161R and the blue light emitting diodes 161B of the red light source device 151R and the blue light source device 151B are. The green light emitting diode 161G of the green light source device 151G is sealed at its front by a cover member, and light emitted from the green light emitting diode 161G is concentrated by the condensing mirror 164. In addition, light from the green light emitting diode 161G passes through the cover member, is then concentrated by the condensing lens 164 so as to be shone on to the light combining device 158, and passes through the dichroic mirror as the light combining device 158 so as to be combined with a light emitting from the second light source 153 for emission on to the third light source 154

The blue light emitting diode 161B, which is referred to as the second light source 153, is disposed in such a manner that optical axes of the first light source 152 and the second light source 153 are normal to each other and emits a blue visible light beam or ultraviolet rays whose central luminescent wavelength is about 460 to 470 nm (nanometer). In addition, the blue light emitting diode 161B, which is referred to as the second light source 153 is also held by a light source holding jig as the green light emitting diode 161G of the second light source 152 is and is sealed at its front by a cover member. Light from the blue light emitting diode 11B is concentrated by the condensing lens 164. In addition, a pencil of light emitted from the second light source 153 is reflected by the dichroic mirror which functions as the light combining device 158 so as to be combined with light from the first light source 152 in such a manner that the direction of an optical axis of light emitted from the second light source 153 coincides with that of an optical axis of light emitted from the first light source 152 and is then shone on to the third light source 154.

Figure 5:
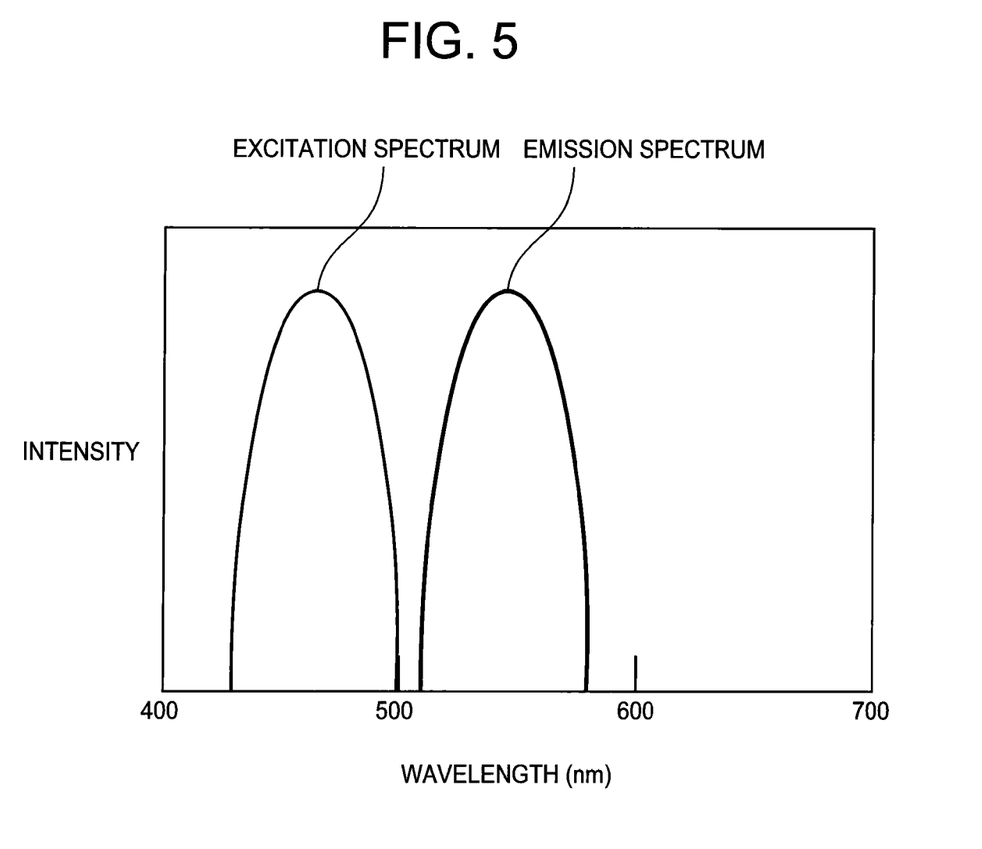
FIG. 5 is a graph showing characteristics of a third light source according to the embodiment of the invention.

As is shown in FIG. 5, the third light source 154 emits green light whose central luminescent wavelength is 540 to 550 nm by absorbing energy of excitation light whose central luminescent wavelength is about 460 to 470 nm and is made into a board-like luminescent material or phosphor (for example, Y3A15012:Ce3+) which has a characteristic which transmits light from the first light source 152. In addition, in pencils of light combined by the light combining device 158 and shone to the third light source 154, green light emitted from the first light source 152 passes the third light source 154 as it is, while blue light emitted from the second light source 153 is absorbed by the third light source 154 as excitation light to thereby cause the third light source 154 to emit green light.

Then, the pencil of light that has passed through the third light source 154 and the pencil of green light that has become luminescent in the third light source 154 are concentrated by a condensing lens 164 which is disposed in the vicinity of the third light source 154 so as to be shone on to the second dichroic mirror 144, are reflected by the second dichroic mirror 144, and thereafter are concentrated to the incident surface of the light smoothing unit 75 shown in FIG. 3 by the condensing lens 148.

In addition, in the case of a phosphor which continues to be luminescent in the form of phosphorescence or delayed fluorescence even after the shining of visible beams and ultraviolet rays has been stopped as the phosphor used in the projector 10, since the reaction speed is slow even in the event that blue light emitting diode 161B is time-sharing controlled, light from the phosphor mixes with light from the light emitting device with the predetermined wavelength band for the different color, which results in light which is mixed with light of the different color being shone on to the display device 51. Consequently, since a clear projection image cannot be provided by the phosphor which becomes luminescent in the form of phosphorescence or delayed fluorescence, in the embodiment, a phosphor with a fast reaction speed is used which is free from luminescence such as phosphorescence or delayed fluorescence.

In addition, as is shown in FIG. 3, the optical system unit 70 is made up of three blocks such as, the shining side block 78 which lies in the vicinity of the light source unit 63, an image generation block 79 and a projection side block 80 and is disposed along the left-hand panel 15.

The shining side block 78 includes part of a light source side optical system 62 which guides light emitted from the light source unit 63 to the display device 51 included in the image generation block 79. As the light source side optical system 62 possessed by the shining side block 78, the light smoothing unit 75 which makes a pencil of light emitted from the light source unit 63 into a light beam of a uniform intensity distribution and a condensing lens which concentrates light that has passes through the light smoothing unit 75 are included.

In addition, the image generation block 79 has as the light source side optical system 62 an optical axis changing mirror 74 which changes the direction of light emitted from the light smoothing unit 75, a light source side lens group 83 which is formed by a plurality of lenses for concentrating light reflected by the optical axis changing mirror 74 to the display device 51 and a shining mirror 84 for shining light that has passed through the optical side lens group 83 on to the display device 51 at a predetermined angle. Further, the image generation block 79 includes a DMD (Digital Micromirror Device) which is referred to as the display device 51. In addition, a display device cooling device 53 for cooling the display device 51 is disposed on a back panel 13 side of the display device 51, so as to prevent the display device 51 from being heated to high temperatures.

Furthermore, the projection side block 80 has a lens group of a projection side optical system 90 which projects light reflected by the display device 51 to thereby form an image on to a screen. This projection side optical system 90 is made up of a variable focus lens which has a zooming function which is realized by including a fixed lens group 93 which in incorporated in a fixed lens barrel and a movable lens group 97 which is incorporated in a movable lens barrel, whereby the movable lens group 97 is moved by a lens motor to enable zooming and focusing.

Next, advantages of the embodiment will be described. In the optical system in the projector 10, a spatial expanse in which beams of light which can be handled effectively exist can be expressed as a product of area and solid angle, and this product is referred to as Etendue. This Etendue is a value preserved in the optical system.

In the projector 10 which employs the display device 51 such as the DMD described above, assuming that the area of an illuminated region of the display device 51 is S' and the solid angle of incident light which can be taken in by the area S' of the illuminated region is Ω', the Etendue of the display device 51 is expressed by S'×Ω'. In addition, assuming that the area of a light emitting region of the light source unit 63 is S and the solid angle of emitted light is Ω, the Etendue of the light source unit 63 is expressed by S×Ω.

Since Etendue is the value preserved in the optical system, when the value of the Etendue of the light source unit 63 which is expressed by S×Ω is smaller than the value of the Etendue of the display device 51 which is expressed by S'×Ω', all the light emitted from the light source unit 63 can be used, and hence, all the emitted light becomes effective light. However, when the value of the Etendue of the light source unit 63 which is expressed by S×Ω is larger than the value of the Etendue of the display device 51 which is expressed by S'×Ω', there occurs a situation in which some of the light emitted form the light source unit 63 cannot be used.

In the related-art projectors which employ light emitting diodes, since the amount of light emitted from a light emitting diode is small, a plurality of light emitting diodes need to be provided in such a manner that beams of light emitted from the plurality of light emitting diodes are collected for use. However, when a plurality of light emitting diodes are used on a plane, since the value of Etendue of the light source unit becomes large compared with the value of Etendue of the display device, there is caused a problem that the amount of light that cannot be used is increased and the utilization efficiency of the light emitting diodes is reduced.

In addition, in light emitting diodes, the quantity of light of a green light emitting diode is lower than those of a red light emitting diode and a blue light emitting diode, a larger number of green light emitting diodes need to be provided than red light emitting diodes and blue light emitting diodes. In this case, since the value of Etendue of green light emitting diodes is increased, the ratio of effective light is decreased, and after all, there still exists a problem that the insufficient quantity of usable light from the green light emitting diodes remains unsolved.

In this embodiment, however, the quantity of green light can be increased without expansion of the area of the light emitting region by employing as the green light source device 151G which is the light source device with the predetermined wavelength band the first light source 152 which employs the green light emitting diode 116G and the third light source 154 which employs the phosphor which becomes luminescent in green by absorbing light emitted from the second light source 153. Namely, the third light source 154 absorbs light from the second light source 153 so as to emit light in the same color as light from the first light source 152 while transmitting light with low luminance from the first light source 152, whereby after the third light source 154, that is, as the whole light source device with the predetermined wavelength band, a pencil of light is emitted which results from the combination of light emitted from the first light source 152 and light produced in the third light source 154. Thus, the quantity of light is increased to become larger than the quantity of light emitted from the first light source 152 as the single light source and the luminance of light so emitted can be increased. In addition, since the value of Etendue becomes a value of Etendue on the light emitting plane of the third light source 154, the utilization efficiency of light emitted from the first light source 152 and the second light source 153 can be enhanced.

In addition, by incorporating the green light source device 15G which can compensate for the insufficient quantity of green light in the light source unit 63 of the projector 10, the difference in quantity of light between red, green and blue light in the light source unit 63 can be eliminated, whereby the projector 10 can be provided which can project a highly bright, clear projection image.

Additionally, by constructing the green light source device in such a manner that the first light source 152 and the second light source 153 are disposed so that their optical axes intersect each other at right angles, the light combining device 158 is disposed in the position where the optical axes of the first light source 152 and the second light source 153 so intersect each other so as to combine the optical axes in such a manner as to cause the directions of the optical axes to coincide with each other and the third light source 154 is disposed on the optical axis of the pencil of light resulting from the combined light, the quantity of light can be increased by a small space. Consequently, the green light source device and hence, the light source unit 63 can easily be accommodated within the interior of the projector 10 which is getting smaller in size and thinner in thickness in recent years.

Note that while in the embodiment described above, the blue light emitting diode 161B is used as the second light source 153, an ultraviolet ray emitting diode and a solid-state light emitting device such as an organic electroluminescence light emitting device can be used as the second light source 153. In this way, also in the case where the ultraviolet ray emitting diode or the solid-state light emitting device which emits organic electroluminescence or laser is used as the second light source 153, a similar advantage to that of the embodiment can be obtained. In addition, as the light combining device 158 which combines light emitted from the first light source 152 and the second light source 153 in such a manner that their optical axes coincide with each other, a dichroic prism can be used in place of the dichroic mirror.

In addition, it is also possible as a natural result to use the light source device with the predetermined wavelength band which is made up of the first light source having the light emitting diode or the solid-state light emitting device which emits light of the predetermined wavelength band, the second light source having the light emitting diode or solid-state light emitting device which emits excitation light and the third light source which emits light of the same wavelength band as the first light source by the use of light emitted from the second light source as excitation energy for the other color light source devices than the green light source device 151G. As this occurs, it becomes possible to realize an increase in quantity of light in the light source devices with the predetermined wavelength bands for the other colors.

In addition, by the use of phosphors of different colors as third light sources, not only the primary colors of light but also yellow (yellow), purple (magenta) and blue (cyan), which are the primary pigment colors can be incorporated in the light source unit 63.

Further, in the case of the light emitting diode or the solid-state light emitting device being constructed as a single body with high luminance, there exists a case where one device configures a light source unit with a predetermined wavelength band. Additionally, when the luminances of the light emitting devices of the respective colors are compared relative to one another, by using the light source device with the predetermined wavelength band which has the first light source, the second light source and the third light source for the light source device with the predetermined wavelength band of a certain color whose luminance is lower or lowest, the luminance of colored light emitted from the device which emits light with a lower luminance can be increased.

It should be noted that the invention is not limited to the embodiment that has been described heretofore but can be modified and/or improved variously without departing from the spirit and scope of the invention.

What is claimed is:

1. A light source unit comprising:
   a first light source comprising a light emitting diode or a solid-state light emitting device which emits light of a predetermined wavelength band,
   a second light source comprising a light emitting diode or a solid-state light emitting device which emits excitation light,
   a first light combining device which combines light emitted from the first light source and light emitted from the second light source such that their optical axes coincide with each other, wherein the first light combining device is disposed at a position where an optical axis of the first light source and an optical axis of the second light source intersect each other, and
   a third light source which transmits the light emitted from the first light source and which emits light of a same wavelength band as the first light source using the light emitted from the second light source as excitation energy, wherein the third light source is disposed on an optical axis of a pencil of light output by the first light combining device so that the pencil of light is shone onto the third light source.

2. The light source unit as set forth in claim 1, wherein the third light source is formed by a phosphor which transmits light emitted from the first light source and absorbs light emitted from the second light source.

3. The light source unit as set forth in claim 1, further comprising:
   a red light source device which emits light whose wavelength band falls within a red light range,
   a green light source device which emits light whose wavelength band falls within a green light range, and
   a blue light source device which emits light whose wavelength band falls within a blue light range, and
   wherein at least one of the red light source device, the green light source device and the blue light source device comprises the first light source, the second light source and the third light source.

4. The light source unit as set forth in claim 3, wherein from among the red light source device, the green light source device and the blue light source device, the green light source device comprises the first light source, the second light source and the third light source.

5. A projector comprising:
   a light source unit;
   a light smoothing unit;
   a display device;
   a projection side optical system; and
   a projector control unit,
   wherein the light source unit comprises:
   a first light source comprising a light emitting diode or a solid-state light emitting device which emits light of a predetermined wavelength band,
   a second light source comprising a light emitting diode or a solid-state light emitting device which emits excitation light,
   a first light combining device which combines light emitted from the first light source and light emitted from the second light source such that their optical axes coincide with each other, wherein the first light combining device is disposed at a position where an optical axis of the first light source and an optical axis of the second light source intersect each other, and
   a third light source which transmits the light emitted from the first light source and which emits light of a same wavelength band as the first light source using the light emitted from the second light source as excitation energy, wherein the third light source is disposed on an optical axis of a pencil of light output by the first light combining device so that the pencil of light is shone onto the third light source.

6. The projector as set forth in claim 5, wherein the third light source is formed by a phosphor which transmits light emitted from the first light source and absorbs light emitted from the second light source.

7. The projector as set forth in claim 5, wherein the light source unit further comprises:
   a red light source device which emits light whose wavelength band falls within a red light range,
   a green light source device which emits light whose wavelength band falls within a green light range, and
   a blue light source device which emits light whose wavelength band falls within a blue light range, and
   wherein at least one of the red light source device, the green light source device and the blue light source device comprises the first light source, the second light source and the third light source.

8. The projector as set forth in claim 7, wherein from among the red light source device, the green light source device and the blue light source device of the light source unit, the green light source device comprises the first light source, the second light source and the third light source.

9. The light source unit as set forth in claim 1, further comprising:
   a fourth light source comprising a red light source device which emits light whose wavelength band falls within a red light range, and a blue light source device which emits light whose wavelength band falls within a blue light range, and
   a second light combining device which combines light emitted from the third light source and light emitted from the fourth light source such that their optical axes coincide with each other, wherein the second light combining device is disposed at a position where an optical axis of the third light source and an optical axis of the fourth light source intersect each other.

10. The light source unit as set forth in claim 9, wherein one of the light source devices of the fourth light source emits light of a same wavelength band as the second light source.

11. The light source unit as set forth in claim 1, wherein the first light source is a green light source which emits light whose wavelength band falls within a green light range, and the second light source is a blue light source which emits light whose wavelength band falls within a blue light range.

12. The light source unit as set forth in claim 1, wherein the second light source is an ultraviolet light source which emits light whose wavelength band falls within an ultraviolet light range.

13. The light source unit as set forth in claim 1, wherein the first light combining device is a dichroic mirror.

14. The projector as set forth in claim 5, wherein the light source unit further comprises:
  a fourth light source comprising a red light source device which emits light whose wavelength band falls within a red light range, and a blue light source device which emits light whose wavelength band falls within a blue light range, and
  a second light combining device which combines light emitted from the third light source and light emitted from the fourth light source such that their optical axes coincide with each other, wherein the second light combining device is disposed at a position where an optical axis of the third light source and an optical axis of the fourth light source intersect each other.

15. The projector as set forth in claim 14, wherein one of the light source devices of the fourth light source emits light of a same wavelength band as the second light source.

16. The projector as set forth in claim 5, wherein the first light source is a green light source which emits light whose wavelength band falls within a green light range, and the second light source is a blue light source which emits light whose wavelength band falls within a blue light range.

17. The projector as set forth in claim 5, wherein the second light source is an ultraviolet light source which emits light whose wavelength band falls within an ultraviolet light range.

18. The projector as set forth in claim 5, wherein the first light combining device is a dichroic mirror.

19. The light source unit as set forth in claim 1, wherein the third light source is disposed on the optical axis of the pencil of light combined by the first light combining device so that the combined light is shone onto the third light source without passing through a filter that restricts a wavelength of light transmitted through or reflected by the filter.

20. The light source unit as set forth in claim 1, wherein the first light combining device transmits the light emitted from the first light source and reflects the light emitted from the second light source so as to combine the light emitted from the first light source with the light emitted from the second light source on a same optical axis.

21. The projector as set forth in claim 5, wherein the third light source is disposed on the optical axis of the pencil of light combined by the first light combining device so that the combined light is directly shone onto the third light source without passing through a filter that restricts a wavelength of light transmitted through or reflected by the filter.

22. The projector as set forth in claim 5, wherein the first light combining device transmits the light emitted from the first light source and reflects the light emitted from the second light source so as to combine the light emitted from the first light source with the light emitted from the second light source on a same optical axis.

23. The light source unit as set forth in claim 1, wherein the light emitted by the first light source that is shone onto and transmitted through the third light source includes a wavelength of the light that is emitted by the third light source.

24. The projector as set forth in claim 5, wherein the light emitted by the first light source that is shone onto and transmitted through the third light source includes a wavelength of the light that is emitted by the third light source.

* * * * *